(12) United States Patent
Ginder et al.

(10) Patent No.: US 11,833,377 B2
(45) Date of Patent: Dec. 5, 2023

(54) FIRE SUPPRESSION SYSTEM FOR BATTERY MODULES

(71) Applicant: SAFT AMERICA, Cockeysville, MD (US)

(72) Inventors: David Barkly Ginder, Jacksonville, FL (US); Michael Joseph Bourg, Jacksonville, FL (US); Nikolay Vladimirovich Semenov, Jacksonville, FL (US); Justin Alexander Trinidad, Jacksonville, FL (US)

(73) Assignee: SAFT AMERICA, Cockeysville, MD (US)

( * ) Notice: Subject to any disclaimer, the term of this patent is extended or adjusted under 35 U.S.C. 154(b) by 957 days.

(21) Appl. No.: 16/697,683

(22) Filed: Nov. 27, 2019

(65) Prior Publication Data
US 2021/0154503 A1 May 27, 2021

(51) Int. Cl.
*A62C 3/16* (2006.01)
*H01M 50/20* (2021.01)
(Continued)

(52) U.S. Cl.
CPC .............. *A62C 3/16* (2013.01); *A62C 35/026* (2013.01); *A62C 35/13* (2013.01); *A62C 35/62* (2013.01);
(Continued)

(58) Field of Classification Search
CPC .. A62C 3/00; A62C 3/002; A62C 3/16; A62C 35/02; A62C 35/026; A62C 35/13;
(Continued)

(56) References Cited

U.S. PATENT DOCUMENTS

| 3,738,429 A | * | 6/1973 | Heller | A62C 3/002 |
| | | | | 169/56 |
| 2014/0290967 A1 | * | 10/2014 | Kirn | A62C 35/00 |
| | | | | 137/15.01 |
| 2020/0139178 A1 | * | 5/2020 | Olivo | A62C 35/68 |

FOREIGN PATENT DOCUMENTS

| CN | 203521551 U | 4/2014 |
| CN | 205564903 U | 9/2016 |
| | (Continued) | |

OTHER PUBLICATIONS

International Search Report dated Jan. 28, 2021 from the International Searching Authority in International Application No. PCT/US2020/056815.
(Continued)

*Primary Examiner* — Darren W Gorman
(74) *Attorney, Agent, or Firm* — Sughrue Mion, PLLC

(57) ABSTRACT

Systems and methods for fire suppression, a fire suppression system including a container configured to receive frames, each of the frames including battery modules; a pipe system including at least one vertically extending pipe, the at least one vertically extending pipe configured to be provided between a respective two of the frames and configured to supply suppressant to at least one of the battery modules of each of the respective two of the frames via slots of the vertically extending pipe; at least one tank connected to the pipe system and configured to store the suppressant; at least one pump configured to recirculate the suppressant to the pipe system or a tank of the at least one tank; and an inlet body configured to connect with a suppressant source, that is external to the container, to provide new suppressant into the pipe system or the at least one tank.

16 Claims, 12 Drawing Sheets

(51) Int. Cl.
*A62C 35/02* (2006.01)
*A62C 35/13* (2006.01)
*A62C 35/62* (2006.01)
*H01M 10/42* (2006.01)

(52) U.S. Cl.
CPC ....... H01M 10/4207 (2013.01); H01M 50/20 (2021.01); H01M 2200/00 (2013.01)

(58) Field of Classification Search
CPC ......... A62C 35/15; A62C 35/58; A62C 35/62; A62C 35/68; H01M 10/4207; H01M 50/20; H01M 2200/00
See application file for complete search history.

(56) References Cited

FOREIGN PATENT DOCUMENTS

| CN | 205759224 | U | | 12/2016 |
|---|---|---|---|---|
| CN | 106684499 | A | | 5/2017 |
| CN | 206867531 | U | | 1/2018 |
| CN | 108853848 | A | | 11/2018 |
| CN | 108926789 | A | | 12/2018 |
| CN | 109173118 | A | | 1/2019 |
| CN | 109193073 | A | | 1/2019 |
| CN | 208525712 | U | | 2/2019 |
| CN | 109999386 | A | | 7/2019 |
| CN | 110010808 | A | * | 7/2019 |
| CN | 110112507 | A | | 8/2019 |
| CN | 110420417 | A | | 11/2019 |
| FR | 2 986 911 | A1 | | 8/2013 |

OTHER PUBLICATIONS

Written Opinion dated Jan. 28, 2021 from the International Bureau in International Application No. PCT/US2020/056815.

* cited by examiner

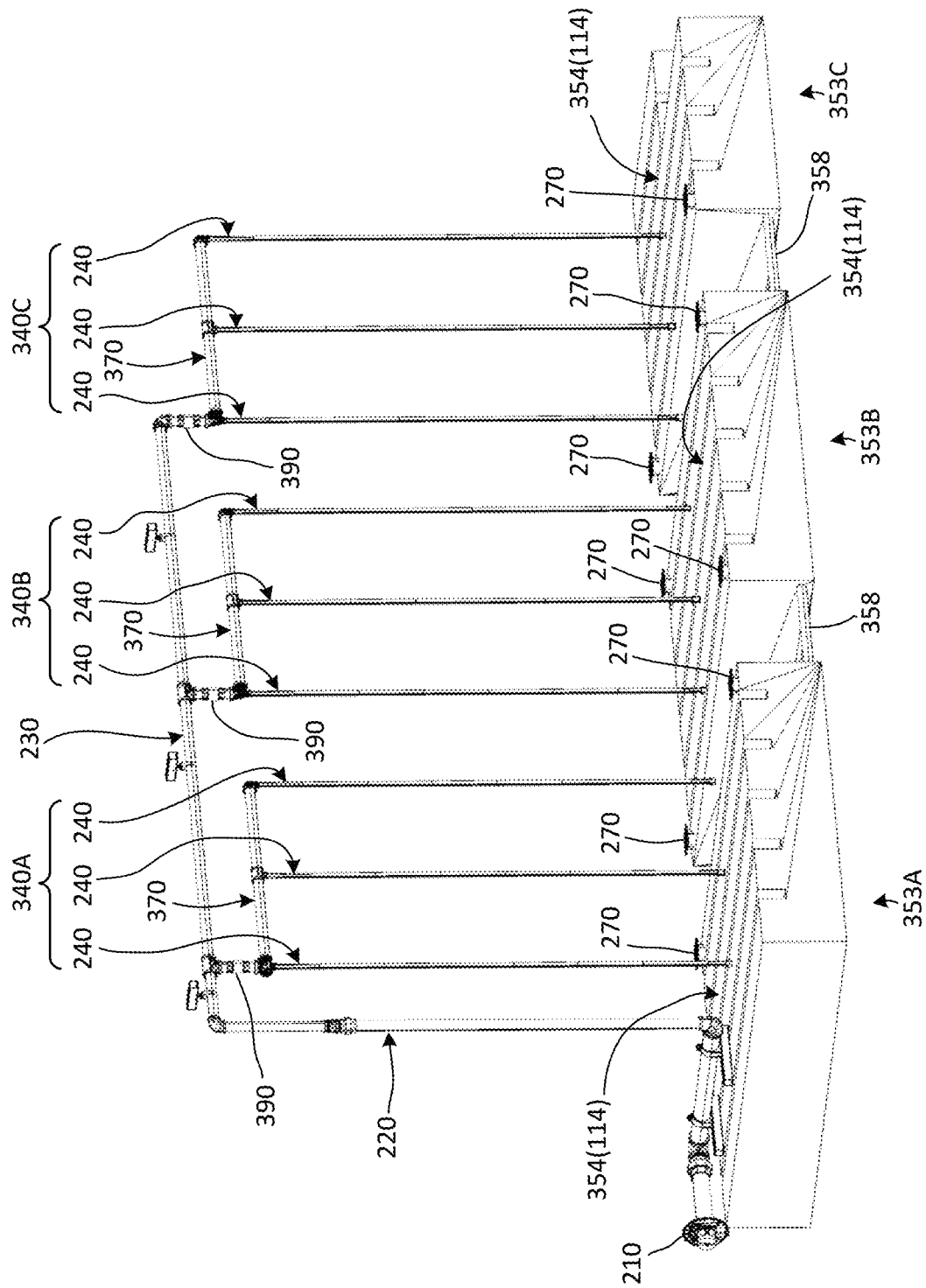

FIRE SUPPRESSION SYSTEM FOR BATTERY MODULES

FIELD

This disclosure is directed to fire suppression systems, more particularly, fire suppression systems for batteries.

BACKGROUND

The use of traditional fire suppression systems and chemicals are often ineffective in stopping thermal runaway in high density Li-Ion energy storage systems.

Some high density Li-Ion energy storage systems may incorporate water impingement fire suppression systems that provide water directly to battery cells to prevent thermal runaway situations. However, such water impingement fire suppression systems typically use a lot of water, as a suppressant, and require constant connection to an external source such as a supply or multiple connections with tankers carrying suppressant.

SUMMARY

Some embodiments of the present disclosure address the above problems and other problems of related art.

For example, some embodiments of the present disclosure negate the requirement for a constant connection to an outside source or a tanker to supply suppressant. Some embodiments of present disclosure mitigate battery module to battery module fire propagation as well as provide limited battery cell to battery cell fire propagation prevention, alleviating much of the risk of catastrophic loss due to fire.

According to some embodiments, a fire suppression system is provided. The fire suppression system comprises: a container configured to receive frames that are separated from each other in a horizontal direction, each of the frames comprising battery modules that are stacked in a vertical direction; a pipe system comprising at least one vertically extending pipe, the at least one vertically extending pipe configured to be provided between a respective two of the frames and configured to supply suppressant to at least one of the battery modules of each of the respective two of the frames via slots of the vertically extending pipe; at least one tank connected to the pipe system and configured to store the suppressant; at least one pump configured to recirculate the suppressant, supplied by the slots of each of the at least one vertically extending pipe of the pipe system, to the pipe system or a tank of the at least one tank; and an inlet body configured to connect with a suppressant source, that is external to the container, to provide new suppressant into the pipe system or the at least one tank.

In an embodiment, the at least one tank is provided in a bottom of the container, and the container comprises a floor with a drain, the drain configured to supply a portion of the suppressant, that is supplied by the slots of each of the at least one vertically extending pipe, to a tank of the at least one tank. In an embodiment, the container comprises an additional drain, the additional drain configured to supply another portion of the suppressant, that is supplied by the slots of each of the at least one vertically extending pipe, to an additional tank of the at least one tank.

In an embodiment, the at least one vertically extending pipe is a plurality of vertically extending pipes, and a pump of the at least one pump is configured to pump the suppressant to at least one first vertically extending pipe of the plurality of vertically extending pipes via one of at least one second vertically extending pipe of the plurality of vertically extending pipes, such that the slots of each of the at least one first vertically extending pipe supply the suppressant. In an embodiment, the drain is configured to supply the suppressant, that is supplied by the slots of the plurality of first vertically extending pipes, to the tank of the at least one tank, and the floor of the container further comprises an additional drain, the additional drain configured to supply the suppressant, that is supplied by the slots of the plurality of second vertically extending pipes, to an additional tank of the at least one tank. In an embodiment, the tank and the additional tank are connected to each other such that one of the at least one pump is configured to pump the suppressant stored in the additional tank into one of the at least one first vertically extending pipe via the tank.

In an embodiment, the fire suppression system further comprises: a controller comprising at least one processor, wherein the at least one first vertically extending pipe is a plurality of first vertically extending pipes, the at least one second vertically extending pipe is a plurality of second vertically extending pipes, the pipe system further comprises a first valve that connects the plurality of first vertically extending pipes to a horizontally extending pipe, the first valve configured to control a flow of the suppressant to all of the plurality of first vertically extending pipes, and the pipe system further comprises a second valve that connects the plurality of second vertically extending pipes to the horizontally extending pipe, the second valve configured to control a flow of the suppressant to all of the plurality of second vertically extending pipes, and the controller is configured to selectively control the first valve and the second valve.

In an embodiment, the fire suppression system further comprises a controller comprising at least one processor, wherein the pipe system further comprises a plurality of valves, including respective valves configured to control flow of the suppressant to each of the plurality of vertically extending pipes, and the controller is configured to selectively control the plurality of valves.

In an embodiment, the at least one vertically extending pipe of the pipe system is a plurality of vertically extending pipes that are spaced from each other in the horizontal direction, and the pipe system further comprises a horizontally extending pipe that communicates the plurality of vertically extending pipes with each other. In an embodiment, the at least one pump is configured to recirculate the suppressant, supplied by the slots of the pipe system, to the at least one tank, and the at least one tank is a single tank, and the single tank is configured to gravity feed the suppressant to the pipe system. In an embodiment, the horizontally extending pipe is mounted to a top of the container.

In an embodiment, the fire suppression system further comprises: an additional container configured to receive frames that are separated from each other in the horizontal direction, each of the frames received by the additional container comprising battery modules that are stacked in the vertical direction, an additional pipe system comprising at least one vertically extending pipe, each of the at least one vertically extending pipe of the additional pipe system configured to be provided between a respective two of the frames of the additional container and configured to supply suppressant to at least one of the battery modules of each of the respective two of the frames of the additional container via slots of the vertically extending pipe of the additional pipe system, wherein the at least one tank is outside the container and the additional container, and the at least one tank is connected to the pipe system and the additional pipe system.

In an embodiment, each of the slots extend in a horizontal plane and are configured to output the suppressant in a flat spray pattern.

According to some embodiments, a battery energy storage system is provided. The battery energy storage system comprises the fire suppression system and the frames that are separated from each other in the horizontal direction and that comprise the battery modules that are stacked in the vertical direction, wherein each of the at least one vertically extending pipe are provided between a respective two of the frames.

According to some embodiments, a fire suppression for a battery energy storage system, including a container having frames that are separated from each other in a horizontal direction, each of the frames comprising battery modules that are stacked in a vertical direction, is provided. The fire suppression system comprises a pipe system comprising at least one vertically extending pipe, each of the at least one vertically extending pipe configured to be provided between a respective two of the frames and configured to supply suppressant to at least one of the battery modules of each of the respective two of the frames via slots of the vertically extending pipe; at least one tank connected to the pipe system and configured to store the suppressant; and at least one pump configured to recirculate the suppressant, supplied by the slots of each of the at least one vertically extending pipe of the pipe system, to the pipe system or a tank of the at least one tank.

In an embodiment, the at least one vertically extending pipe of the pipe system is a plurality of vertically extending pipes that are spaced from each other in the horizontal direction, and the pipe system further comprises a horizontally extending pipe that communicates the plurality of vertically extending pipes with each other. In an embodiment, the horizontally extending pipe is mounted to a top of the container. In an embodiment, each of the slots extend in a horizontal plane and are configured to output the suppressant in a flat spray pattern. In an embodiment, each of the slots are configured to output the suppressant on a top of a respective one of the battery modules of the frames.

According to some embodiments, a method for forming a battery energy storage system is provided. The method comprises: providing a container and frames, inside the container, the frames separated from each other in a horizontal direction, each of the frames comprising battery modules that are stacked in a vertical direction, and providing a pipe system comprising at least one vertically extending pipe, each of the at least one vertically extending pipe provided between a respective two of the frames and configured to supply suppressant to at least one of the battery modules of each of the respective two of the frames via slots of the vertically extending pipe; providing at least one tank, the at least one tank connected to the pipe system and configured to store the suppressant; and providing at least one pump, the at least one pump configured to recirculate the suppressant, supplied by the slots of each of the at least one vertically extending pipe of the pipe system, to the pipe system or a tank of the at least one tank.

BRIEF DESCRIPTION OF THE DRAWINGS

Further features, the nature, and various advantages of the disclosed subject matter will be more apparent from the following detailed description and the accompanying drawings in which:

FIG. 7 illustrates a first perspective view of a fire suppression system according to a second embodiment.

DETAILED DESCRIPTION

In embodiments of the pressure disclosure, low volume direct impingement fire suppression systems for containerized Battery Energy Storage Systems (BESS) are provided.

According to embodiments of the present disclosure, low volume direct impingement fire suppression systems are provided, wherein the system is a captured closed loop system that recirculates suppressant. For example, the systems may pump suppressant to an event (e.g. a fire) by using, for example, one or more pumps, capture the suppressant, and return the suppressant to, for example, one or more tanks to be distributed repeatedly. Tanks of the present disclosure may be associated with anti-evaporation drains and a visual gauge to indicate refill requirements during maintenance (e.g. annual maintenance).

According to embodiments of the present disclosure, a fixed volume of water may be used in the captured closed loop systems. Accordingly, the captured closed loop systems may thwart the need for connected or continuous water supply and may alleviate the need for contaminated wastewater or spill containment. Embodiments of the present disclosure have been tested and shown to be effective against the thermal propagation between Li-Ion battery modules. Embodiments of the present disclosure may also resist a thermal loss of suppressant.

Figure 1:
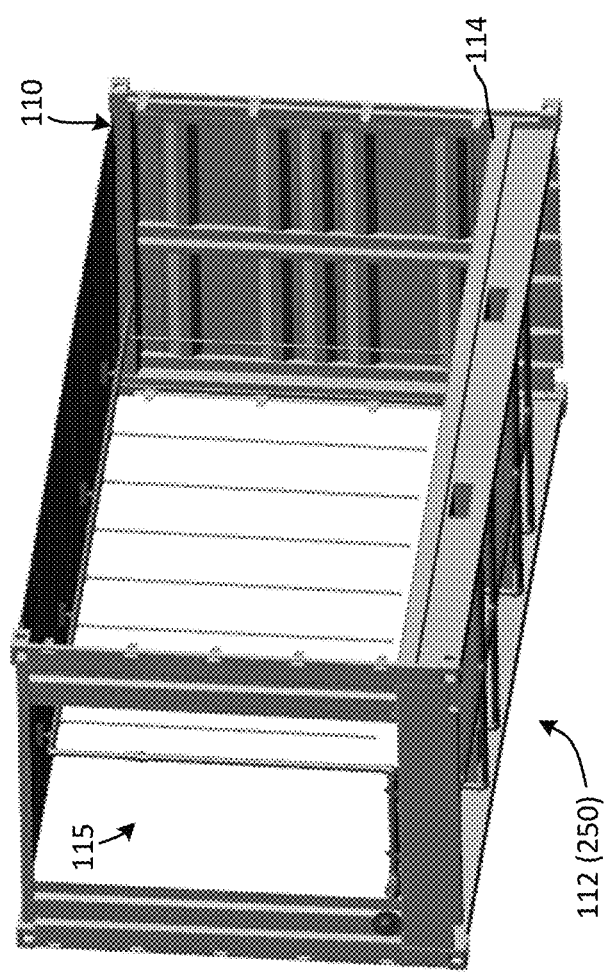
FIG. 1 illustrates a perspective view of a fire suppression system according to a first embodiment.
Figure 2:
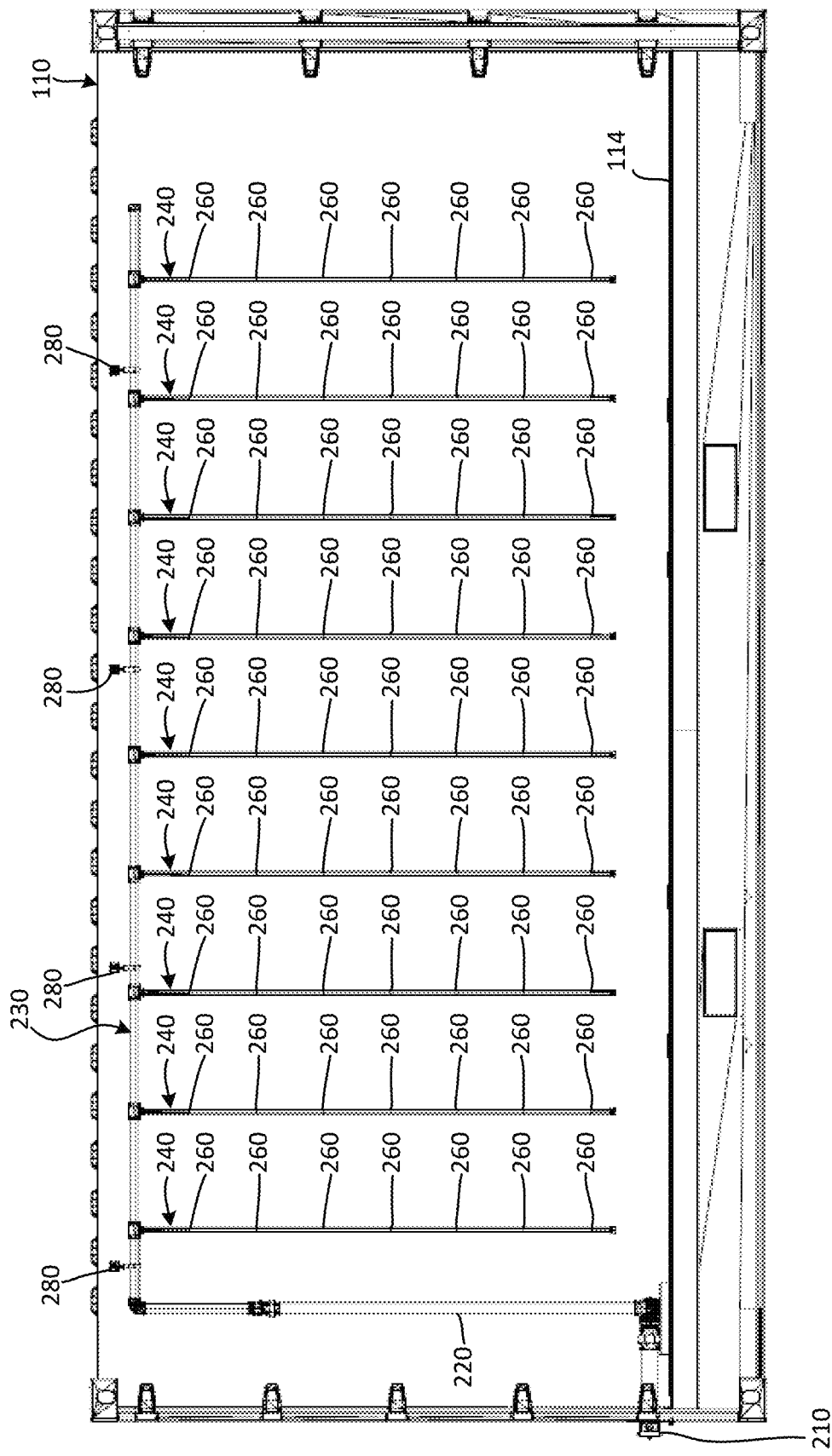
FIG. 2 illustrates a front view of the fire suppression system according to the first embodiment.

FIG. 1 illustrates a perspective view of a fire suppression system 200. FIG. 2 illustrates a side view of the fire suppression system 200.

With reference to FIGS. 1-2, a fire suppression system 200 of an embodiment may include a pipe system 115 that provided with a container 110.

The container 110 may be, for example, any standard or customized ISO container. In an embodiment, the container 110 is up to 53 feet in length. In an embodiment, the container 110 is an IM20HE prototype container. The pipe system 115 may include a suppressant interface 210, a connection pipe 220, a horizontal extending pipe 230, and vertical extending pipes 240. The horizontal extending pipe 230 may be connected to a ceiling of the container 110 by struts 280. The fire suppression system 200 may also include component 250 within an underside 112 of the container 110, below a floor 114 of the container 110. The components 250 may include, for example, pipes for transferring the suppressant, tanks for holding the suppressant, and pumps for pumping the suppressant to the pipe system 115 for supplying the suppressant to an event (e.g. a fire). The components 250 may be provided between the I-beam support structure at the underside 112 of the container 110.

The suppressant interface 210 may be an inlet body configured to introduce suppressant (e.g. water) into the container 110 to be supplied to the vertical extending pipes 240, via the connection pipe 220 and the horizontal extending pipe 230. In some embodiments, the suppressant interface 210 may be connected to another part of the fire suppression system (e.g. a holding tank(s)), that is not shown in FIGS. 1-2, and may be configured to enable the suppressant to recirculate to the vertical extending pipes 240. In some embodiments, the suppressant interface 210 may be a snoot that is a Fire Department (FD) connection for a fire hose to supply suppressant (e.g. water) to the fire suppression system 200. The snoot may have a size in accordance with standards for FD connections for any country, and may be adapted to conform with any of such standards. The suppressant interface 210 may include a valve (e.g. a check valve) that prevents suppressant from leaving through the snoot and prevents a fire hose connected to the snoot from over filling tanks of the fire suppression systems of the present disclosure. The snoots of the present disclosure may be used to allow for "top off" of suppressant during scheduled maintenance of the fire suppression systems of the present disclosure. In the embodiments of the present disclosure, the snoot may be configured to connect to an external suppressant source (e.g. a fire hose or a tank) so as to provide an initial fill of the tanks of the fire suppression systems for recirculation of suppressant, additional suppressant when a fire department arrives, and an emergency backup water source in case pumps or other components of the fire suppressant systems for recirculation becomes inoperable.

The horizontal extending pipe 230 is an overhead supply pipe connected to the vertical extending pipes 240, and configured to supply suppressant to the vertical extending pipes 240. The vertical extending pipes 240 may be a series of modular distribution pipes that each include a plurality of openings 260 configured to distribute suppressant to battery modules 130, as discussed further below. Each of the openings 260 located on the vertical extending pipes 240 may be modular specific, and the locations of the openings 260 may be set based on the height and horizontal location of variable types of bodies 120 and variable stacks of battery modules 130. Each of the openings 260 may be a slot. In embodiments, the openings 260 may provide a suppressant flow in flat customizable patterns that spray across the battery modules. In embodiments, the vertical extending pipes 240 and their openings 260 may be placed such that suppressant flowing into the suppressant interface 210, or from a holding tank(s) of the fire suppression system 200, may reach every battery module 130 within the container 110 via the openings 260.

In embodiments, the vertical extending pipes 240 may be associated with one or more electronic valves that can be controlled by any device, including, for example, a fire panel, a pull station, etc., to selectively supply suppressant to none, all, or particular ones of the vertical extending pipes 240 for releasing suppressant. Accordingly, the electronic valves may be used to spray suppressant on selected battery modules.

The underside 112 of the container 110 may include various components for recirculation or holding of the suppressant. For example, the underside 112 may include the pipes which are connected to drains 270, illustrated in FIG. 4. The drains 270 may be configured to recover the suppressant supplied by the vertical extending pipes 240 and provide the suppressant to the components 250. The components 250 may be connected to, for example, a tank (not shown) within the underside 112 of the container 110, or outside of the container 110, for storing the suppressant until needed again to be supplied to a battery module(s) by one or more of the vertical extending pipes 240.

Figure 3:
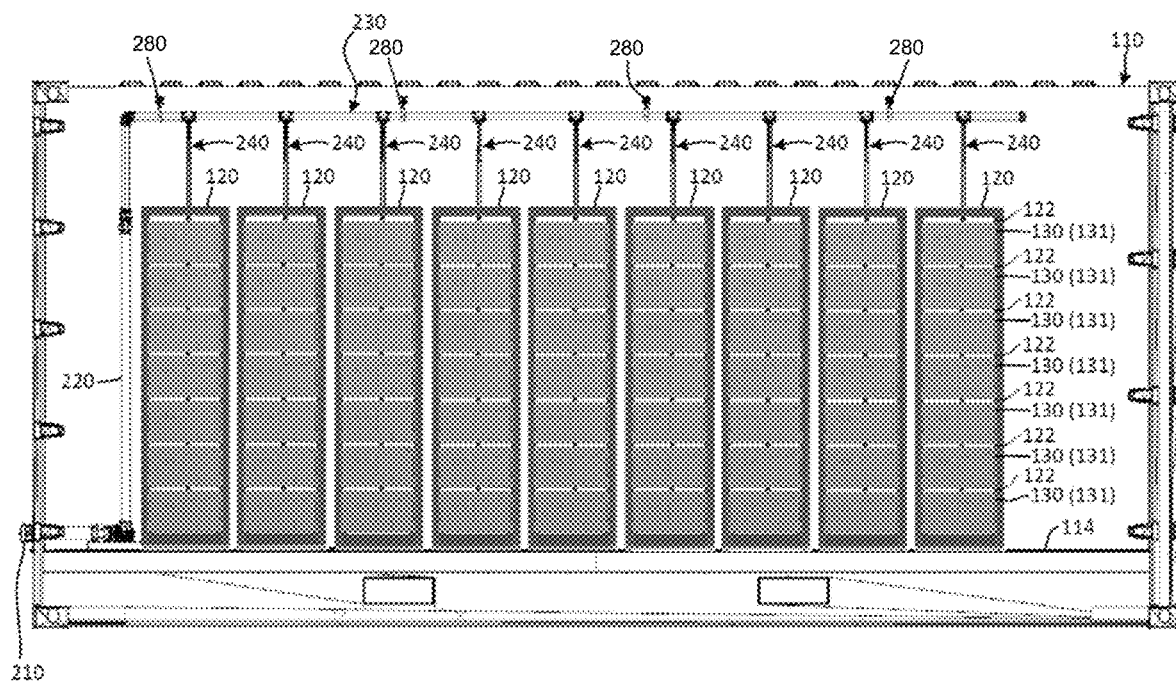
FIG. 3 illustrates a front view of the fire suppression system according to the first embodiment, wherein battery modules are provided.
Figure 4:
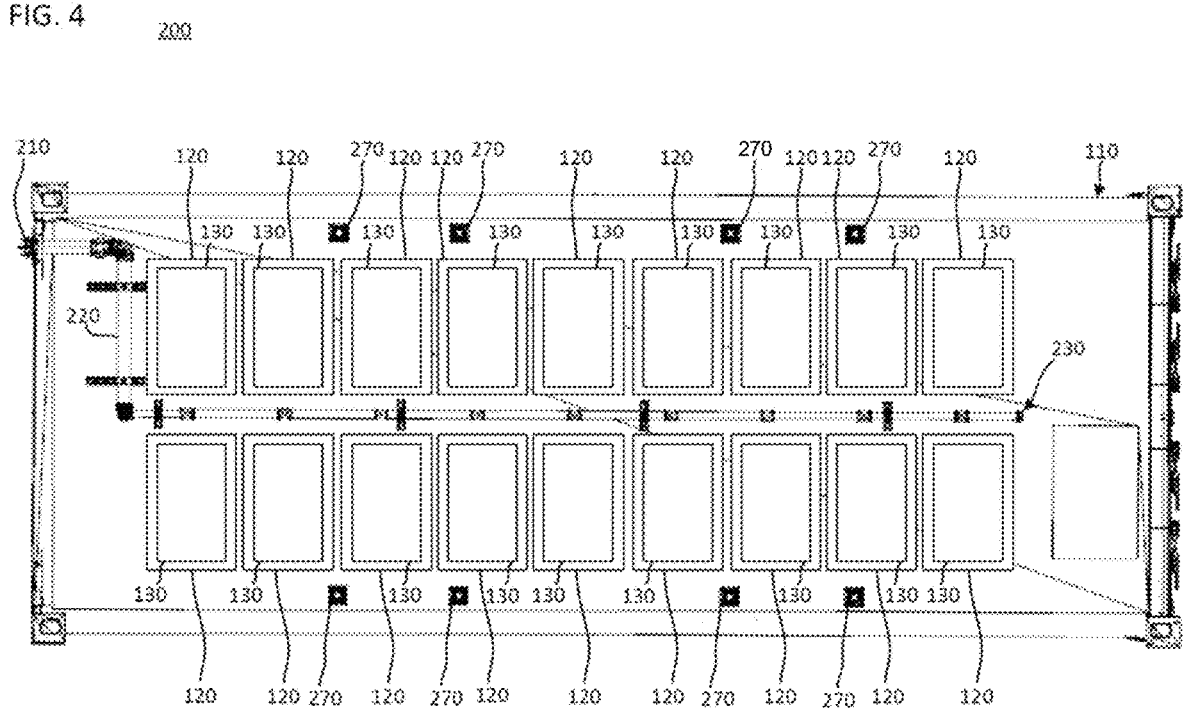
FIG. 4 illustrates a top view of the fire suppression system according to the first embodiment, wherein battery modules are provided.

With reference to FIGS. 3-4, the container 110 holds bodies 120, each of the bodies 120 may hold a respective set of battery modules 130 in a vertical stack, and each of the battery modules 130 may include battery cells 131. In embodiments, the battery cells 131 may be, for example, Li-Ion battery cells. The combination of the container 110 with the bodies 120, the battery modules 130, and the battery cells 131 may be considered a BESS system. The components of the fire suppression systems of the present disclosure may implemented with BESS systems during an assembly process of the BESS systems, but can also be fitted into existing containers of BESS systems. For example, the components of the fire suppression systems of the present disclosure may be adapted to BESS systems located in occupied or high hazard facilities in compliance with NPFA regulations.

In an embodiment, the bodies 120 may be frames that include openings that expose one or more sides of the battery modules 130 to an outside of the bodies 120, and the bodies 120 may be separated from each other in a horizontal plane. The bodies 120 may be configured to hold the battery modules 130 such that there are through spaces 122, through the bodies 120, above each of the battery modules 130. A top surface of each of the battery modules 130 may communicate with an outside of the bodies 120 via the through spaces 122.

Containers of the present disclosure may hold the bodies 120 in any configuration, including any number of rows, any number of columns, and any number of bodies 120. As a non-limiting example, with reference to FIG. 4, the bodies 120 may be provided in two rows within the container 110, wherein the rows mirror each other along a central lengthwise axis of the container 110. The battery modules 130 may be, for example, the group of battery cells 131 or a body that retains the battery cells 131.

With reference to FIGS. 3-4, the horizontal extending pipe 230 may be positioned overhead and between the rows of bodies 120, and each of the vertical extending pipes 240 may extend downward, from the horizontal extending pipe 230, to directly between a respective two of the bodies 120. Each of the vertical extending pipes 240 may be configured to, via the openings 260 provided thereon, provide (e.g. spray) the suppressant onto all of the battery modules 130 held by the respective bodies 120 in which the vertical extending pipe 240 is between. In an embodiment, the suppressant may be provided to a top face of each of the battery modules 130 by the openings 260 of the vertical extending pipes 240 providing the suppressant to the through spaces 122.

Figure 5:
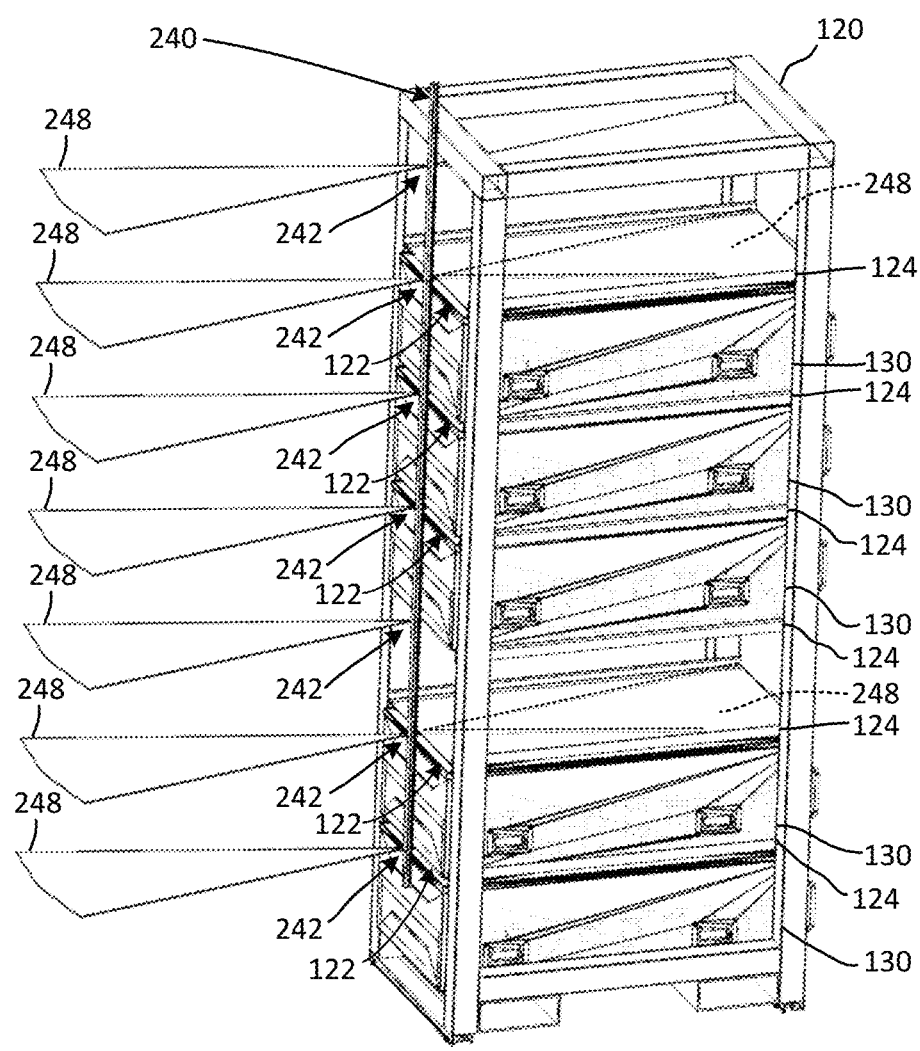
FIG. 5 is a diagram that illustrates a spray pattern of vertical extending pipes of embodiments.

With reference to FIG. 5, example positions of the openings 260 on the vertical extending pipes 240 and example spray patterns 248 of the openings 260 are described. FIG. 5 illustrates one of the vertical extending pipes 240 and one of the bodies 120, with some battery modules 130 omitted for illustrative purposes. It is to be understood that the vertical extending pipe 240 illustrated in FIG. 5 may be sandwiched between the body 120 and another body 120 that is presently not shown for illustrative purposes.

With reference to FIG. 5, each of the vertical extending pipes 240 may include, for example, a series of pairs 242 of cuts, as the openings 260, spaced along the vertical extending pipe 240 in the vertical direction. For each pair 242 of cuts of a vertical extending pipe 240, each cut of the pair 242 may face towards a respective body 120 and provide a respective spray pattern 248 of suppressant. Accordingly, each cut of the pairs 242 may provide a respective spray pattern 248 on to a respective battery module 130. With reference to FIG. 5, the pairs 242 of cuts may be positioned such that the suppressant of the spray patterns 248 is provided between a top of each of the battery modules 130 and the shelves 124 of the body 120 that hold the battery modules 130. Accordingly, suppressant may be provided to a top surface of each of the battery modules 130.

Figure 6B:
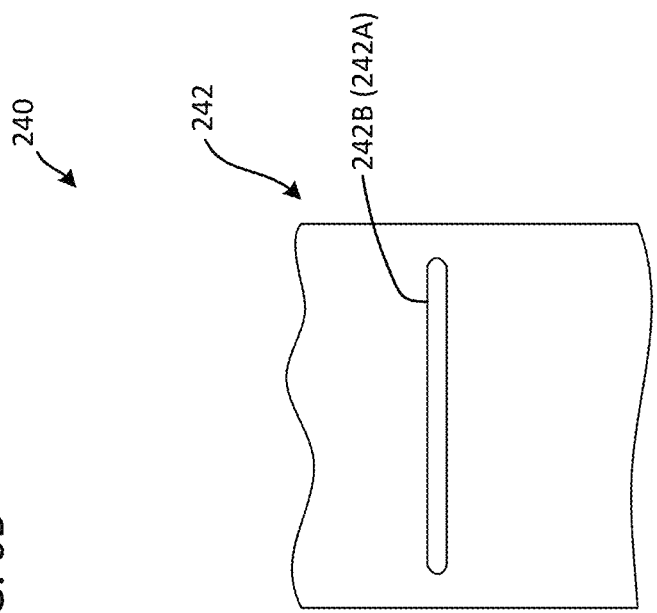
FIG. 6B illustrates a partial front view of the portion of the vertical extending pipe of embodiments that includes the pair of cuts.
Figure 6A:
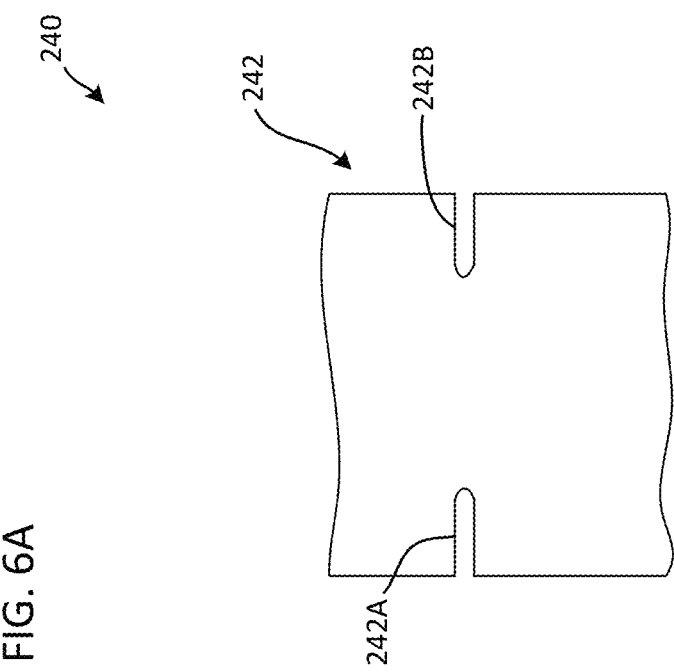
FIG. 6A illustrates a partial side view of a portion of a vertical extending pipe of embodiments that includes a pair of cuts.

With reference to FIGS. 6A and 6B, a non-limiting example shape of the pairs 242 of cuts are described. FIGS. 6A and 6B illustrate a partial view of the vertical extending pipe 240 where one pair 242 of cuts is located.

In particular, FIG. 6A illustrates a partial side view of a portion of a vertical extending pipe 240 of embodiments that includes the pair of cuts 242. With reference to FIG. 4, the partial side view is from a perspective along the extending direction of the horizontal pipe 230. FIG. 6B illustrates a partial front view of the portion. With reference to FIG. 4, the partial front view is from a prospective of one of the bodies 120, towards the horizontal extending pipe 230 where a vertical extending pipe 240 is connected.

With reference to FIG. 6A, each of the pairs 242 of cuts may include a first slot cut 242A and second slot cut 242B on opposite sides of the vertical extending pipe 240 in the horizontal plane. The first slot cut 242A and the second slot cut 242B may be configured to each provide a respective spray pattern 248 of suppressant to a battery module 130 of a respective body 120 that is adjacent to the vertical extending pipe 240. In other words, the first slot cut 242A may provide suppressant to a battery module 130 of one body 120 and the second slot cut 242B may provide suppressant to a battery module 130 of another body 120.

In embodiments, as illustrated in FIG. 6B, a shape of the second slot cut 242B may extend in the horizontal direction and have a narrow height. The first slot cut 242A may have a same shape as the second slot cut 242B, and may be provided such that the first slot cut 242A and the second slot cut 242B, together, provide a hole through the vertical extending pipe 240 in the horizontal plane. In an embodiment, with reference to FIG. 6B, the first slot cut 242A and the second slot cut 242B may have a height of 1 mm (±0.2 mm) and a width of 10.5 mm. In the embodiment, with reference to FIG. 6A, the first slot cut 242A and the second slot cut 242B may have depth of 4.77 mm (±0.13 mm). However, in embodiments of the present disclosure, the pairs of cuts 242 may be sized and shaped for a particular purpose or use in other embodiments.

Figure 8:
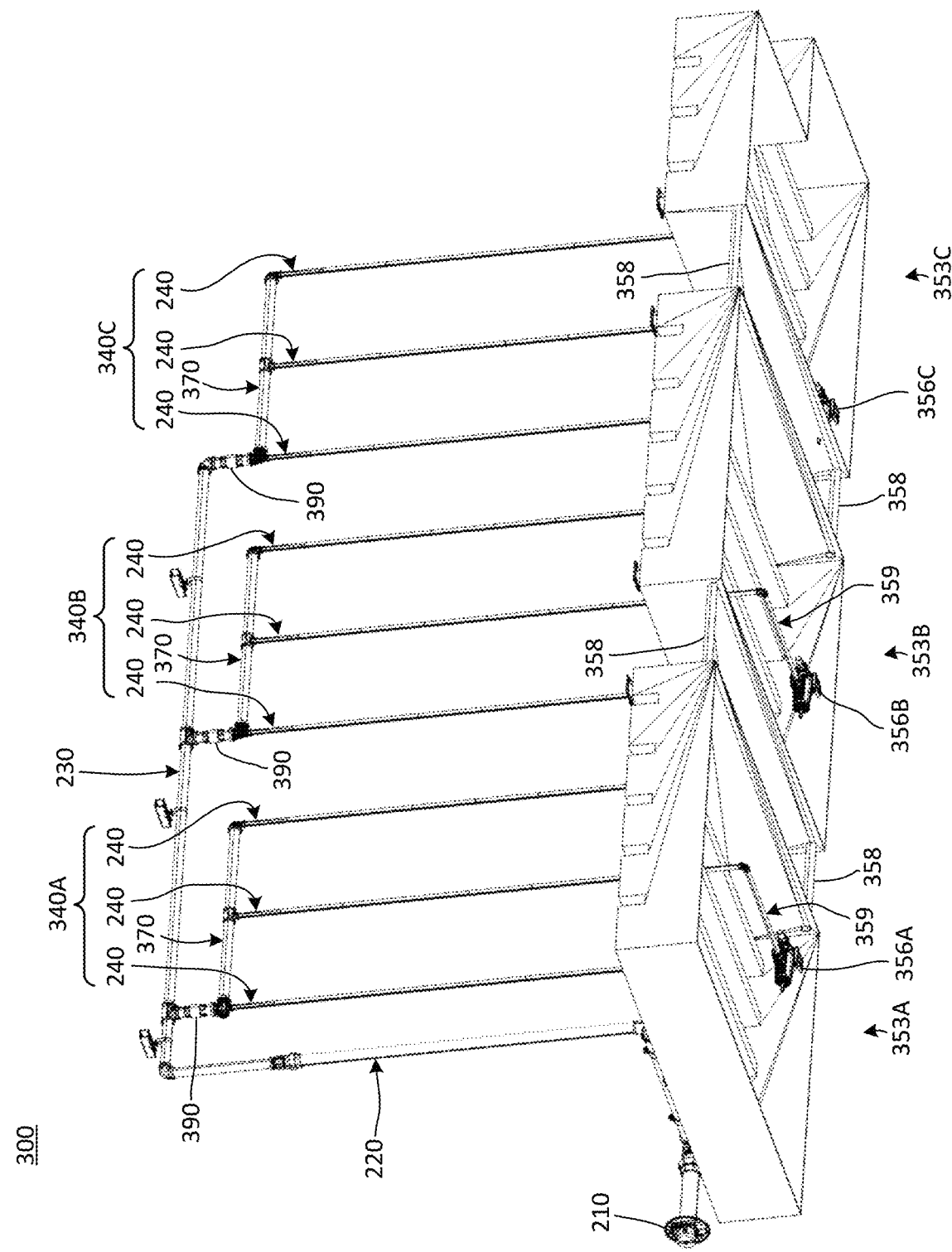
FIG. 8 illustrates a second perspective view of the fire suppression system according to the second embodiment.

With reference to FIGS. 7-8, a fire suppression system 300 is described, which is a modified version of the fire suppression system 200. Descriptions of previously described elements are omitted. Additionally, while the elements illustrated in FIGS. 7-8 may be provided in the container 110, the walls and ceiling of the container 110 is omitted from FIGS. 7-8 for illustrative purposes.

As illustrated in FIG. 7, the fire suppression system 300 may include a plurality of groups of the vertical extending pipes 240. As a non-limiting example, three groups 340A, 340B, and 340C may be included, wherein each of the groups 340A-C includes three vertical extending pipes 240. However, embodiments of the present disclosure may include any number of groups and any number of vertical extending pipes 240 within each group. In embodiments, the vertical extending pipes 240 of each of the groups may be connected together via an intermediate horizontal pipe 370, and the intermediate horizontal pipe 370 may be connected to the horizontal extending pipe 230 with a valve 390 (e.g. a check valve) disposed there between.

Each of the valves 390 may be configured to stop suppressant from flowing between one of the groups 340A-C of the vertical extending pipes 240 and the horizontal extending pipe. In embodiments, the valves 390 may be selectively controlled by a controller with at least one processor and memory. For example, the valves 390 may be controlled by the controller 900, illustrated in FIG. 12, based on an input to the controller 900 that indicates fire suppression is needed with respect to one or more battery modules 130.

The fire suppression system 300 may also include a respective tank for each of the groups. For example, the fire suppression system 300 may include tanks 353A, 353B, and 353C. The tanks 353A-C may be placed in an underside of a container of the fire suppression system 300. For example, the tanks 353A-C may be provided in the underside 112 of the container 110 that is illustrated in FIG. 1. Additionally, as illustrated in FIG. 7, the top surfaces 354 of the tanks 353A-C may be portions of the floor 114 of the container 110. Alternatively, in embodiments, the tanks 353A-C may be placed under the floor 114 and distinct from the floor 114. In embodiments, the tanks 353A-C may consume all available space between an I-Beam support structure within the underside 112 of the container 110. The tanks 353A-C may also be connected to drains 270, within the floor 114 of the container 110, that allows suppressant supplied by the vertical extending pipes 240 to return to the tanks 353A-C.

With reference to FIG. 8, each of the tanks 353A-C may be associated with a pump that can distribute the contents of the tank, in which it is associated, into the group of vertical extending pipes 240 that is above the tank. For illustrative purposes, FIG. 8 illustrates the tanks 353A-C with a bottom wall of the tanks 353A-C removed. In embodiments, as illustrated in FIG. 8, the pumps 356A-C may be included in the tanks 353A-C. The tank 353A-C may be interconnected in such a way that any single pump has access to the suppressant in all of the tanks 353A-C. For example, as illustrated in FIG. 8, the tanks 353A-C may be connected together by tubes 358 that may transfer the suppressant between the tanks 353A-C. The tubes 358 may be, for example, one or more pipes or hoses.

Each of the pumps 356A-C may be connected, via a tube 359, to one or more of the vertical extending pipes 240 of a respective one of the groups 340A-C, so as to be configured to pump suppressant to the vertical extending pipes 240. For example, as illustrated in FIG. 8, the pump 356A may be connected via a tube 359 to the vertical extending pipe 240 that is at the center of the group 340A, the pump 356B may be connected via a tube 359 to the vertical extending pipe 240 that is at the center of the group 340B, and the pump 356C may be connected via a tube 359 (not shown) to the vertical extending pipe 240 that is at the center of the group 340C. Accordingly, each of the pumps 356A-C may pump suppressant into the center vertical extending pipe 240 of a respective one of the groups 340A-C. The tubes 359 may be, for example, one or more pipes or hoses.

With the above configuration, the pump 356A may pump suppressant such that all of the vertical extending pipes 240 of the group 340A supply suppressant, the pump 356B may pump suppressant such that all of the vertical extending pipes 240 of the group 340B supply suppressant, and the pump 356C may pump suppressant such that all of the vertical extending pipes 240 of the group 340C supply suppressant.

Depending on electronic control of the valves 390, any one of the pumps 356A-C may also pump suppressant to a neighboring group(s) of vertical extending pipes 240 such that the neighboring group(s) of vertical extending pipes 240 supply suppressant. For example, when the valve 390 above the group 340A is in an open state and the pump 356A is pumping suppressant, the pump 356A may cause suppressant to be supplied to the group 340A and to the horizontal extending pipe 230. Accordingly, in a case where the valve 390 above the group 340B is also in an open state, the pump 356A may cause the suppressant to be supplied to the group 340B such that the group 340B supplies the suppressant. In a case where the valve 390 above the group 340C is also in an open state, the pump 356A may cause the suppressant to be supplied to the group 340C such that the group 340C supplies the suppressant. Alternatively, when the valve 390 above the group 340A is in a close state and the pump 356A is pumping suppressant, the pump 356A may cause suppressant to be supplied only to group 340A such that group 340A supplies the suppressant. Accordingly, selective release of suppressant among groups 340A-C is realized.

In embodiments, the fire suppression system 300 may alternatively or additionally have a respective valve (e.g. check valve) associated with each vertical extending pipe 240. Accordingly, based on the electronic control of such valves, one or more of the pumps 340A-C may supply to one or more of the vertical extending pipes 240 that are selected for releasing suppressant. Accordingly, selective release of suppressant among vertical extending pipes 240 in a same group is realized.

In embodiments, the fire suppression system 300 may only include a single pump, instead of pumps 356A-C. For example, any two of the pumps 356A-C may be omitted. The single pump may pump suppressant to any number of the groups 340A-C and any number of vertical extending pipes 240 of the groups 340A-C, for releasing suppressant, based on the selective control of the valves described above.

Figure 9:
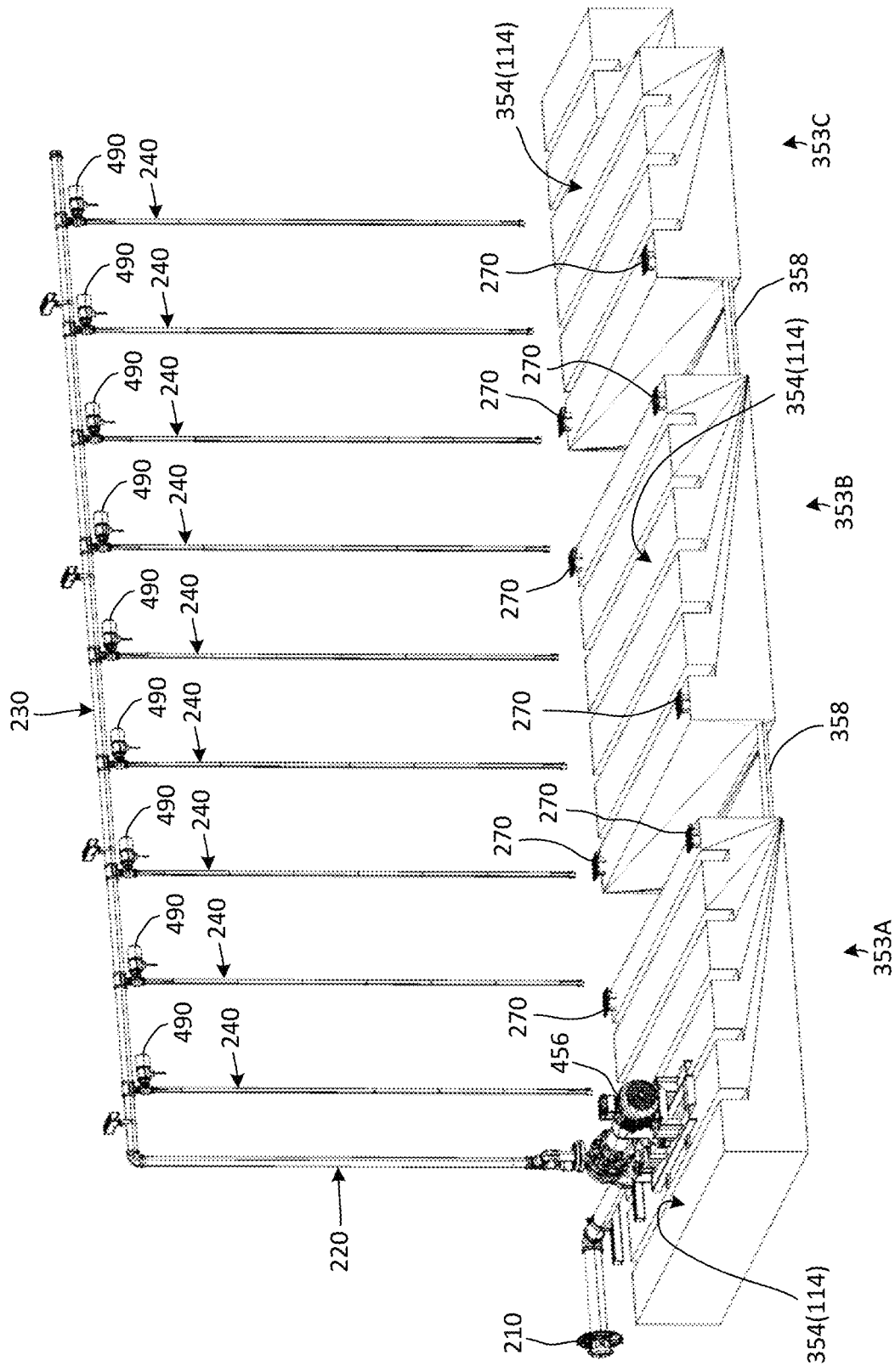
FIG. 9 illustrates a perspective view of a fire suppression system according to a third embodiment.

With reference to FIG. 9, a fire suppression system 400 is described, which is a modified version of the fire suppression system 300. The descriptions of previously described elements are omitted. Additionally, while the elements illustrated in FIG. 9 may be provided in the container 110, at least the walls and ceiling of the container 110 are omitted from FIG. 9 for illustrative purposes.

The fire suppression system 400 may be similar to the fire suppression system 300, illustrated in FIGS. 7-8, except may have at least the following differences.

The vertical extending pipes 240 may be connected to the horizontal extending pipe 230, without an intermediate horizontal pipe 370 disposed there between as provided in the fire suppression system 300. Further, instead of having the valve configuration illustrated in FIGS. 7-8, the fire suppression system 400 includes a respective valve 490, that is electronically controllable, between each vertical extending pipe 240 and the horizontal extending pipe 230. The valves 490 may be, for example, check valves.

Each of the valves 490 may be configured to stop suppressant from flowing to a respective one of the vertical extending pipes 240 from the horizontal extending pipe 230, and vice versa in some embodiments. In embodiments, the valves 490 may be selectively controlled by a controller with at least one processor and memory. For example, the valves 490 may be controlled by the controller 900, illustrated in FIG. 12, based on an input to the controller 900 that indicates fire suppression is needed with respect to one or more battery modules 130.

The fire suppression system 400 may include a pump 456 that is outside an underneath of the container 110, instead of the pumps 356A-C of the fire suppression system 300. For example, as illustrated in FIG. 9, the pump 456 may be on top of the floor 114 of the container 110. Alternatively, the pump may be outside of the container 110. After suppressant is collected by the drains 270, the pump 456 may be configured to pump the suppressant, that is underneath the floor 114 in the tanks 353A-C, to the horizontal extending pipe 230 via the connection pipe 220. Accordingly, depending on control of the valves 490, the pump 456 may pump the suppressant to a selected vertical extending pipe(s) 240 for releasing the suppressant through the openings of the vertical extending pipe(s) 240.

Figure 10:
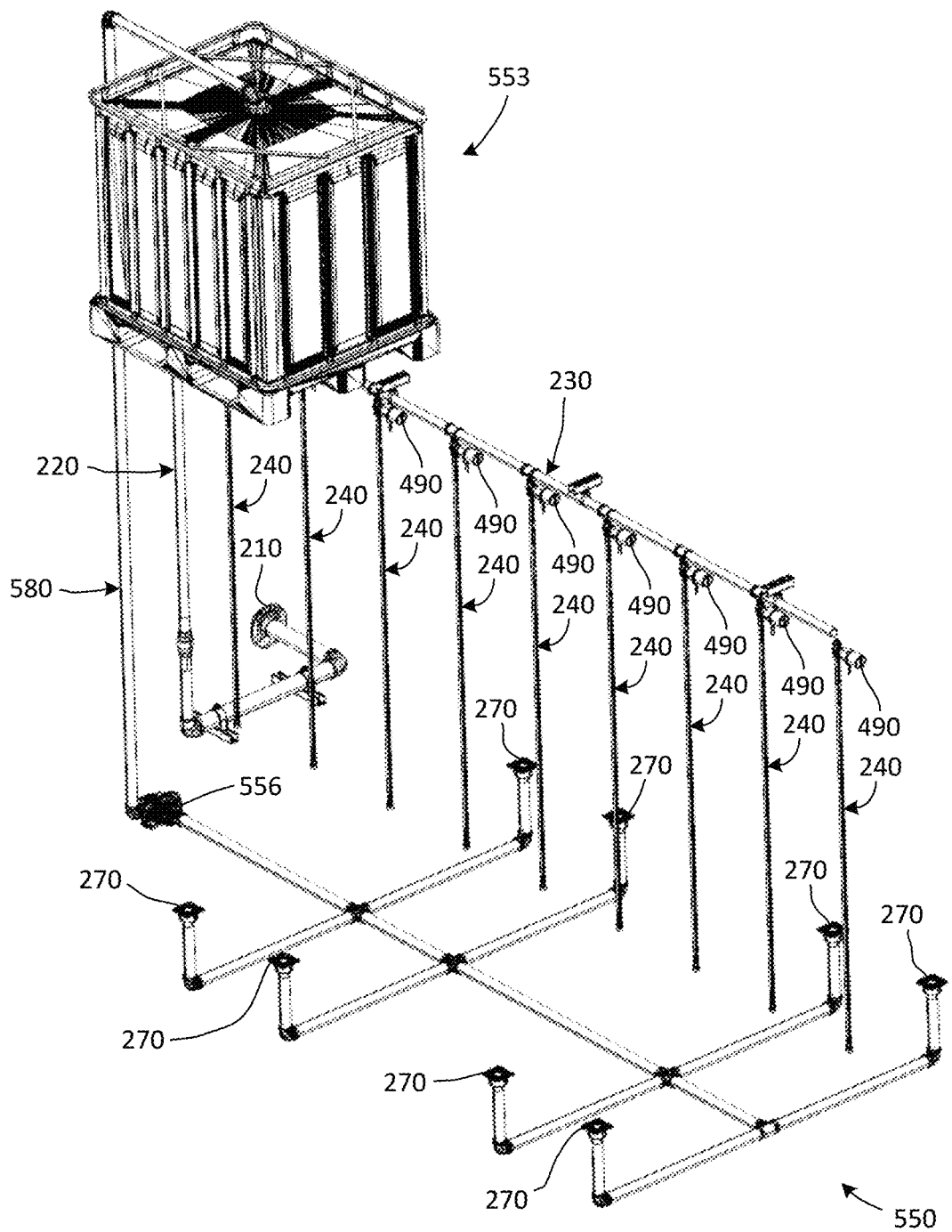
FIG. 10 illustrates a perspective view of a fire suppression system according to a fourth embodiment.

With reference to FIG. 10, a fire suppression system 500 is described, which is a modified embodiment of the fire suppression system 400. The descriptions of previously described elements are omitted. Additionally, while the elements illustrated in FIG. 10 may be provided in the container 110, the container 110 is omitted from FIG. 10 for illustrative purposes.

As illustrated in FIG. 10, the fire suppression system 500 may include a tank 553, instead of the tanks 353A-C illustrated in FIGS. 7-9. The tank 553 may be located on top of the container 110 occupying part or all available space on top of the container 110. The tank 553 may be connected to the connecting pipe 220 such that the tank 553 may supply suppressant to the horizontal extending pipe 230. In the underside 112 of the container 110 (not shown in FIG. 10), tubes 550 may be provided instead of the tanks 353A-C. The tubes 550 may include, for example, one or more pipes or hoses. The tubes 550 may connect the drains 270 to a pump 556, which may be connected to the tank 553 by a pipe 580. With reference to FIG. 10, the pump 556 may be located in the underside 112 of the container 110. However, the pump 556 may alternatively be located outside of the container 110 or inside the container 110, above the floor 114 of the container 110.

In such configurations, the pump 556 may be configured to pump the suppressant collected by the drains 270 and the tubes 550 to the tank 553 to be held. In embodiments, the pump 556 may be controlled by the controller 900, illustrated in FIG. 12, to pump the suppressant when the controller 900 detects suppressant nearby the pump 556 via a sensor. The tank 553 may be configured to gravity feed the suppressant to the horizontal extending pipe 230 via a connection at a bottom side of the tank 553. Accordingly, depending on control of the valves 490, the tank 553 may supply the suppressant to a selected vertical extending pipe(s) 240 for releasing the suppressant.

In embodiments, a second pump may be provided in the tank 553 or between the tank 553 and the horizontal extending pipe 230, and the second pump may be configured to pump suppressant to one or more of the vertical extending pipes 240 via the horizontal extending pipe 230.

Figure 11:
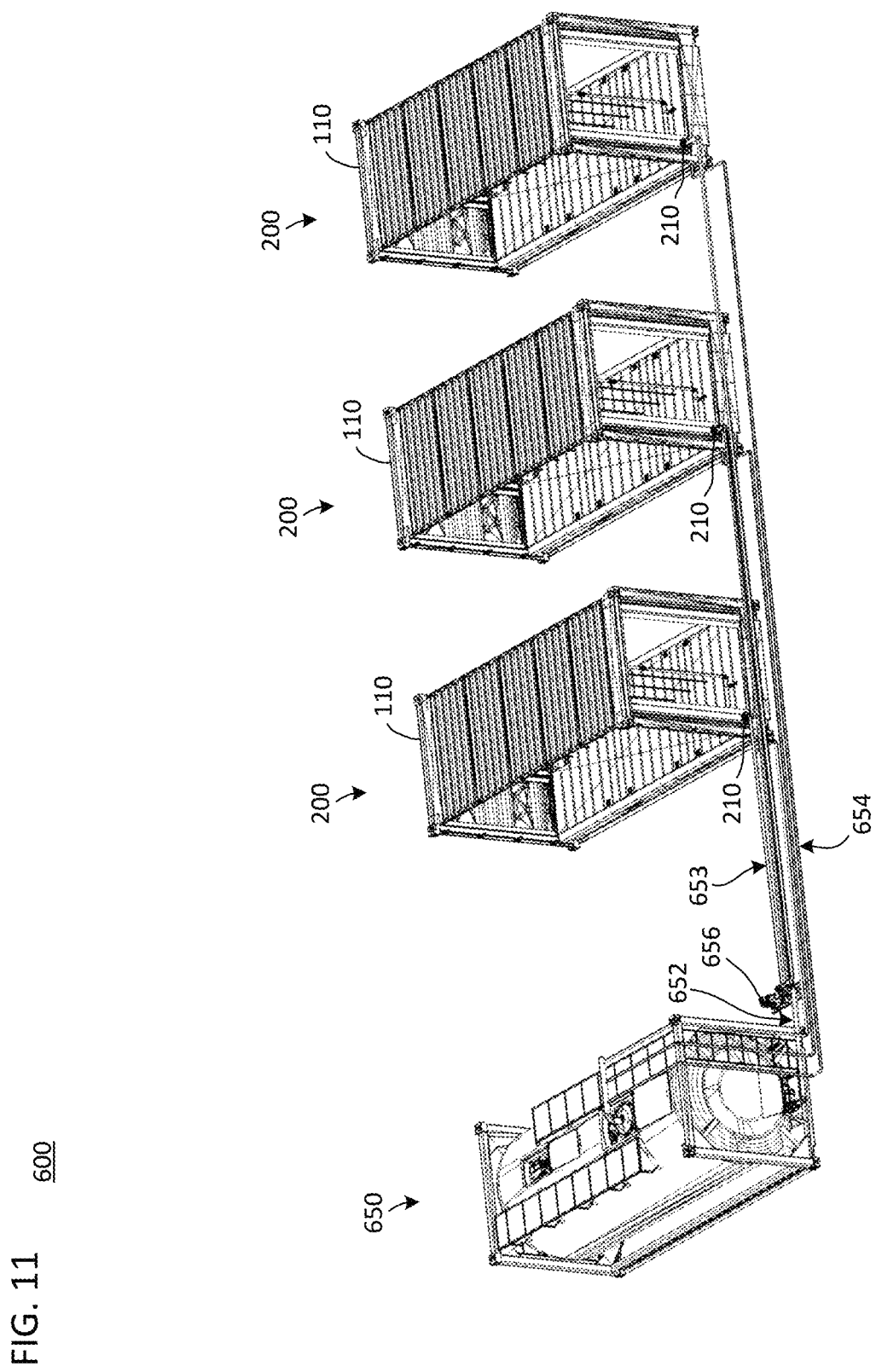
FIG. 11 illustrates a perspective view of a system according to a fifth embodiment.

With reference to FIG. 11, a system 600 is described.

As illustrated in FIG. 11, the system 600 includes a plurality of the fire suppression systems 200, wherein a tank 650 and a pump system 656, comprising at least one pump, is provided outside the containers 110 of the fire suppression systems 200. The tank 650 may be placed on a surface of the ground, or in an approved application, placed underground to protect it from the environment. The tank 650 may be connected to the pump system 656 by a first tubing system 652 that may include, for example, one or more pipes or hoses. The pump system 656 may be connected to the suppressant interfaces 210 of the suppression systems 200 by a second tubing system 653 that may include, for example, pipes or hoses provided in parallel. And the tank 650 may be connected to the suppression systems 200 by a third tubing system 654 that may include, for example, pipes or hoses provided in parallel. With reference to FIGS. 1 and 11, the third tubing system 654 may be connected to the components 250 that are provided in the underside 112 of the containers 110. The pump system 656 may cause suppressant stored in the tank 650 to be supplied to the fire suppression systems via the first tubing system 652 and the second tubing system 653. With reference to FIGS. 4 and 11, after the fire suppression systems 200 releases the suppressant via one or more vertical extending pipes 240 and the suppressant is collected by the drains 270 of the fire suppression systems 200, the suppressant may be returned to the tank 650 via the third tubing system 654.

For example, for each of the suppression systems 200, a pump of the suppression system 200 may be configured to return the suppressant, that is collected by the drains 270 of the fire suppression system 200, to the tank 650 via the third tubing system 654. The pump system 656 may be configured to selectively pump suppressant to one or more of the suppression systems 200 via the second tubing system 653. Accordingly, the pump system 656 may be configured to cause the vertical extending pipes 240 of the fire suppression systems 200 to release suppressant onto battery modules 130.

Although system 600 has been described to include the fire suppression systems 200. The system 600 may alternatively or additionally include other fire suppression systems. For example, the system 600 may include one or more of the fire suppression systems 300-500.

According to the above configurations, the tank 650 and the pump system 656 of the system 600 may provide fire suppression to a group of containers configured as BESS systems.

In embodiments, the tank 650 may include its own suppressant interface (e.g. a fire hose connection) such that a fire department can fill the tank 650 with suppressant, without approaching the fire suppression systems 200.

Figure 12:
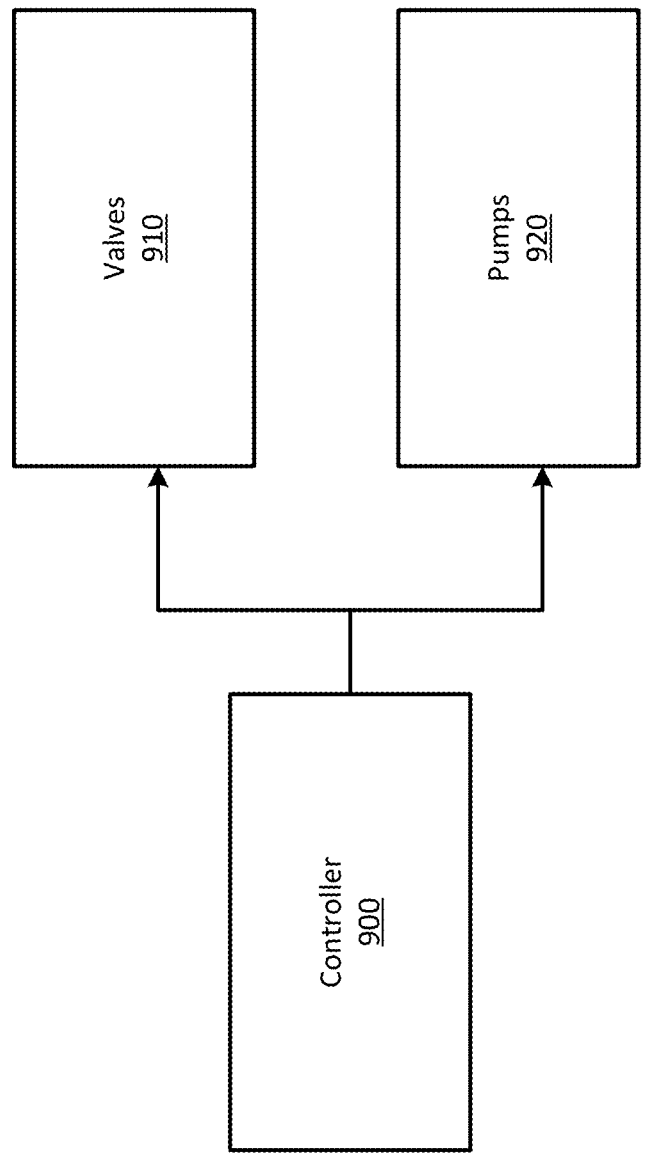
FIG. 12 is a block diagram illustrating a controller, valves, and pumps of embodiments.

With reference to FIG. 12, the fire suppression systems of the present disclosure may include a controller 900 that comprises at least one processor and memory storing computer instructions that, when executed by the at least one processor, causes the controller 900 to perform its functions. The controller 900 may control a suppressant flow of the fire suppression systems by controlling valves 910 to selectively open and close and pumps 920 to pump suppressant. The valves 910 controlled may include for, example, valves 390, valves 490, and all other valves of the present disclosure. The pumps 920 controlled may include, for example, pumps 356A-C, pump 456, pump 556, pump system 656, and all other pumps of the present disclosure. The controller 900 may control the valves 910 and the pumps 920 based on sensor inputs or inputs from a fire panel, a pull station, etc., to selectively cause one or more of the vertical extending pipes 240 to supply suppressant to battery modules 130 or a holding tank.

In embodiments, the controller 900 may be configured to determine suppressant levels of the fire suppression systems based on sensor inputs, and display the suppressant levels on a display (e.g. a digital display). Alternatively or additionally, the fire suppression systems of the present disclosure may include gauges that indicate suppressant levels.

According to embodiments of the present disclosure, a requirement for a constant connection to an outside source or a tanker to supply suppressant may be negated, battery module to battery module fire propagation may be mitigated, and some prevention of battery cell to battery cell fire propagation may be provided. Accordingly, much of the risk of catastrophic loss due to fire is alleviated.

The term "or" as used herein is an inclusive "or", and has a meaning equivalent to "and/or."

Embodiments of the present disclosure may achieve the advantages described herein. It should also be appreciated that various modifications, adaptations, and alternative embodiments thereof may be made within the scope and spirit of the present disclosure.

What is claimed is:

1. A fire suppression system comprising:
   a container configured to receive frames that are separated from each other in a horizontal direction, each of the frames comprising battery modules that are stacked in a vertical direction;
   a pipe system comprising at least one vertically extending pipe, each vertically extending pipe of the at least one vertically extending pipe configured to be provided between a respective two of the frames and configured to supply suppressant to at least one of the battery modules of each of the respective two of the frames via slots of the vertically extending pipe;
   at least one tank connected to the pipe system and configured to store the suppressant;
   at least one pump configured to recirculate the suppressant, supplied by the slots of each of the at least one vertically extending pipe of the pipe system, to the pipe system or a tank of the at least one tank; and
   an inlet body configured to connect with a suppressant source to provide new suppressant into the pipe system or the at least one tank, the suppressant source being external to the container,
   wherein the at least one vertically extending pipe comprises a first plurality of vertically extending pipes and a second plurality of vertically extending pipes,
   the at least one tank comprises the tank and an additional tank, and the tank and the additional tank are under a floor of the container, connected together, and in between two support beams that are under the floor,
   the floor of the container comprises a drain, the drain configured to supply the suppressant, that is supplied by slots of the first plurality of vertically extending pipes, to the tank, and
   the floor of the container further comprises an additional drain, the additional drain configured to supply the suppressant, that is supplied by slots of the second plurality of vertically extending pipes, to the additional tank.

2. The fire suppression system of claim 1, wherein a pump of the at least one pump is configured to pump the suppressant to at least one of the first plurality of vertically extending pipes through another vertically extending pipe, such that the slots of each of the first plurality of vertically extending pipes supply the suppressant.

3. The fire suppression system of claim 1, wherein the tank and the additional tank are connected to each other such that a pump of the at least one pump is configured to pump the suppressant stored in the additional tank into one of the at least one first vertically extending pipe via the tank.

4. The fire suppression system of claim 2, further comprising:
a controller comprising at least one processor, wherein
the pipe system further comprises a first valve that connects the first plurality of vertically extending pipes to a horizontally extending pipe, the first valve configured to control a flow of the suppressant to all of the first plurality of vertically extending pipes, and
the pipe system further comprises a second valve that connects the second plurality of vertically extending pipes to the horizontally extending pipe, the second valve configured to control a flow of the suppressant to all of the second plurality of vertically extending pipes, and
the controller is configured to selectively control the first valve and the second valve.

5. The fire suppression system of claim 2, further comprising:
a controller comprising at least one processor, wherein
the pipe system further comprises a plurality of valves, including respective valves configured to control flow of the suppressant to each of the first plurality of vertically extending pipes and the second plurality of vertically extending pipes, and
the controller is configured to selectively control the plurality of valves.

6. The fire suppression system of claim 1, wherein
the first plurality of vertically extending pipes are spaced from each other in the horizontal direction, and
the pipe system further comprises a horizontally extending pipe that communicates the first plurality of vertically extending pipes with each other.

7. The fire suppression system of claim 6, wherein the horizontally extending pipe is mounted to a top of the container.

8. The fire suppression system of claim 1, further comprising:
an additional container configured to receive frames that are separated from each other in the horizontal direction, each of the frames received by the additional container comprising battery modules that are stacked in the vertical direction,
an additional pipe system comprising at least one vertically extending pipe, each of the at least one vertically extending pipe of the additional pipe system configured to be provided between a respective two of the frames of the additional container and configured to supply suppressant to at least one of the battery modules of each of the respective two of the frames of the additional container via slots of the vertically extending pipe of the additional pipe system.

9. The fire suppression system of claim 1, wherein each of the slots extend in a horizontal plane and are configured to output the suppressant in a flat spray pattern.

10. A battery energy storage system comprising:
the fire suppression system of claim 1, and
the frames that are separated from each other in the horizontal direction and that comprise the battery modules that are stacked in the vertical direction, wherein each of the at least one vertically extending pipe are provided between a respective two of the frames.

11. A fire suppression system for a battery energy storage system including a container having frames that are separated from each other in a horizontal direction, each of the frames comprising battery modules that are stacked in a vertical direction, the fire suppression system comprising:
a pipe system comprising at least one vertically extending pipe, each vertically extending pipe of the at least one vertically extending pipe configured to be provided between a respective two of the frames and configured to supply suppressant to at least one of the battery modules of each of the respective two of the frames via slots of the vertically extending pipe;
at least one tank connected to the pipe system and configured to store the suppressant; and
at least one pump configured to recirculate the suppressant, supplied by the slots of each of the at least one vertically extending pipe of the pipe system, to the pipe system or a tank of the at least one tank,
wherein the at least one vertically extending pipe comprises a first plurality of vertically extending pipes and a second plurality of vertically extending pipes,
the at least one tank comprises the tank and an additional tank, and the tank and the additional tank are under a floor of the container, connected together, and in between two support beams that are under the floor,
the floor of the container comprises a drain, the drain configured to supply the suppressant, that is supplied by slots of the first plurality of vertically extending pipes, to the tank, and
the floor of the container further comprises an additional drain, the additional drain configured to supply the suppressant, that is supplied by slots of the second plurality of vertically extending pipes, to the additional tank.

12. The fire suppression system of claim 11, wherein
the first plurality of vertically extending pipes are spaced from each other in the horizontal direction, and
the pipe system further comprises a horizontally extending pipe that communicates the first plurality of vertically extending pipes with each other.

13. The fire suppression system of claim 12, wherein the horizontally extending pipe is mounted to a top of the container.

14. The fire suppression system of claim 11, wherein each of the slots extend in a horizontal plane and are configured to output the suppressant in a flat spray pattern.

15. The fire suppression system of claim 11, wherein each of the slots are configured to output the suppressant on a top of a respective one of the battery modules of the frames.

16. A method for forming a battery energy storage system, the method comprising:
providing a container and frames, inside the container, the frames separated from each other in a horizontal direction, each of the frames comprising battery modules that are stacked in a vertical direction, and
providing a pipe system comprising at least one vertically extending pipe, each vertically extending pipe of the at least one vertically extending pipe provided between a respective two of the frames and configured to supply suppressant to at least one of the battery modules of each of the respective two of the frames via slots of the vertically extending pipe;

providing at least one tank, the at least one tank connected to the pipe system and configured to store the suppressant; and providing at least one pump, the at least one pump configured to recirculate the suppressant, supplied by the slots of each of the at least one vertically extending pipe of the pipe system, to the pipe system or a tank of the at least one tank, wherein the at least one vertically extending pipe includes a first plurality of vertically extending pipes and a second plurality of vertically extending pipes, the at least one tank includes the tank and an additional tank, and the tank and the additional tank are provided such as to be under a floor of the container, connected together, and in between two support beams that are under the floor, the floor of the container includes a drain, the drain configured to supply the suppressant, that is supplied by slots of the first plurality of vertically extending pipes, to the tank, and the floor of the container further includes an additional drain, the additional drain configured to supply the suppressant, that is supplied by slots of the second plurality of vertically extending pipes, to the additional tank.

* * * * *